(12) United States Patent
Clough et al.

(10) Patent No.: US 6,591,917 B2
(45) Date of Patent: Jul. 15, 2003

(54) HORSE FARRIER TOOL

(75) Inventors: David E. Clough, 246 Pine St., Barnstable, MA (US) 02668; David W. Vos, P.O. Box 1270, Orleans, MA (US)

(73) Assignees: David E. Clough, Barnstable, MA (US); David W. Vos, Delaplane, VA (US)

( * ) Notice: Subject to any disclaimer, the term of this patent is extended or adjusted under 35 U.S.C. 154(b) by 0 days.

(21) Appl. No.: 10/050,823

(22) Filed: Jan. 18, 2002

(65) Prior Publication Data

US 2002/0117310 A1 Aug. 29, 2002

Related U.S. Application Data

(60) Provisional application No. 60/262,035, filed on Jan. 18, 2001.

(51) Int. Cl.$^7$ ................................................. A01L 11/00
(52) U.S. Cl. ........................................................ 168/45
(58) Field of Search ............................... 168/45; 81/418, 81/419, 420

(56) References Cited

U.S. PATENT DOCUMENTS

| | | | | | |
|---|---|---|---|---|---|
| 68,567 A | * | 9/1867 | Koyl | ............................ | 168/45 |
| 512,228 A | * | 1/1894 | Seeliger | ......................... | 168/45 |
| 544,931 A | * | 8/1895 | Rosch | ........................... | 168/45 |
| 920,834 A | * | 5/1909 | Deevy | ........................... | 168/45 |
| 4,696,346 A | * | 9/1987 | Ryan | ............................ | 168/45 |
| 5,816,327 A | * | 10/1998 | Howey | ........................... | 168/45 |
| 6,023,833 A | * | 2/2000 | Jacobsmeier | ................. | 81/420 |

* cited by examiner

*Primary Examiner*—Charles T. Jordan
*Assistant Examiner*—Elizabeth Shaw
(74) *Attorney, Agent, or Firm*—Katten Muchin Zavis Rosenman

(57) ABSTRACT

A tool for removing retaining clips from a surface, and particularly from a horseshoe attached to an animal's hoof, that includes a first plier lever, a second plier lever, a pivot point at which the first and second plier levers are rotatably fastened, an upper jaw portion on the first plier lever where the upper jaw is a wedge, and a lower jaw portion on the second plier lever where the lower jaw has a face that contacts the wedge when the first and second plier levers are pivoted closed, thereby providing support for the surface from which the fastener is being removed. Also included are a method of removing retaining clips, particularly from a horseshoe attached to an animal's hoof.

24 Claims, 5 Drawing Sheets

HORSE FARRIER TOOL

FIELD OF THE INVENTION

This invention relates generally to a tool for loosening retaining clips on items that incorporate such clips, for example, horseshoes. The tool opens the retaining clips and enables removal of the item secured by the clips from the surface to which it is attached by preventing binding of the clips against the surface. The tool of this invention is structurally similar to a pair of pliers, but incorporates specialized jaw parts. The tool preferably also has a lever length adequate to allow single-handed use. The invention also includes a method of removing retaining clips that is highly effective and efficient. The tool of this invention is particularly well-suited for use in removing retaining clips used to secure horseshoes to the hooves of animals.

DESCRIPTION OF THE RELATED ART

Horseshoes are traditionally attached to the hooves of horses or other animals by nailing the shoe to the underside of the hoof. In addition, many horseshoes include clips or vertical tabs at various locations on the shoe, where the clips are plastically deformed to fit snugly against the outer wall of the hoof by clamping around the outer edge of the hoof. Use of these clips provides lateral stability to the horseshoe, and assists in retaining the shoe on the hoof. However, although the clips provide greater stability of the shoe on the hoof, they make the task of removing horseshoes more difficult and time-consuming because they are difficult to remove.

Removal of horseshoes held in place with clips or vertical tabs usually involves using a hammer-driven wedge that opens the clips by forcing them away from the outer wall of the hoof prior to removal of the horseshoe. This is necessary to remove the shoe without binding it against the outer wall of the hoof, which can be damaging to the hoof, and may cause discomfort to the animal. This method of removing horseshoes held in place using additional clips or vertical tabs is cumbersome, and requires that the farrier utilize two hands to place the wedge and use a hammer to loosen the clips.

Accordingly, there is a need in the art for a device for loosening or removing retaining clips from horseshoes that involves less effort on the part of the farrier, and can preferably be accomplished using one hand. There is also a need for a method for removing horseshoe retaining clips that minimizes any damage to the animal's hoof and reduces any discomfort caused to the animal during the process of removing the horseshoe. There is also a more generalized need for a tool useful in removing clips and retaining tabs used in various other applications. The tool and method of this invention avoid these problems, as will be discussed in greater detail below.

SUMMARY OF THE INVENTION

The apparatus and methods of this invention address the need in the art for a more efficient tool and method for removing horseshoes secured using retaining clips, as well as other applications where clips are used to secure items. More specifically, and in accordance with one aspect of the invention, an apparatus for removing a fastener from a surface includes a first plier lever; a second plier lever; a pivot point at which said first and second plier levers are rotatably fastened; an upper jaw portion provided on said first plier lever, wherein said upper jaw portion is a wedge; and a lower jaw portion provided on said second plier lever, wherein said lower jaw portion has a face that contacts said wedge when said first and second plier levers are pivoted closed, and provides support for the surface from which the fastener is being removed.

In accordance with another aspect of the invention, a method for removing a fastener from a surface includes the steps of providing a first plier lever; providing a second plier lever; providing a pivot point at which said first and second plier levers are rotatably fastened; providing an upper jaw wedge portion on said first plier lever; inserting said wedge portion between the fastener and the surface; providing a lower jaw portion on said second plier lever; placing said lower jaw portion against the base of said surface; and pivoting the first and second plier levers such that the wedge portion is pivoted toward said lower jaw portion, thereby wedging the fastener from said surface.

In accordance with yet another aspect of the invention, an apparatus for removing retaining clips from a horseshoe fastened to an animal hoof includes a first plier lever; a second plier lever; a pivot point at which said first and second plier levers are rotatably fastened; an upper jaw portion provided on said first plier lever, wherein said upper jaw portion is a wedge; and a lower jaw portion provided on said second plier lever, wherein said lower jaw portion has a face that contacts said wedge when said first and second plier levers are pivoted closed, and provides support for the horseshoe from which the fastener is being removed.

According to still another aspect of the invention, a method of removing retaining clips from a horseshoe fastened to an animal hoof includes the steps of providing a first plier lever; providing a second plier lever; providing a pivot point at which said first and second plier levers are rotatably fastened; providing an upper jaw wedge portion on said first plier lever; inserting said wedge portion between the retaining clip and the animal hoof, providing a lower jaw portion on said second plier lever; placing said lower jaw portion against the base of said horseshoe; and pivoting the first and second plier levers such that the wedge portion is pivoted toward said lower jaw portion, thereby wedging the retaining clip away from said animal hoof.

It will be apparent to those skilled in the art that only the preferred embodiments have been described by way of exemplification, and that there are various modifications that fall within the scope of this invention. These and other aspects of this invention will be discussed in greater detail below.

DESCRIPTION OF THE PREFERRED EMBODIMENTS

While this invention will be described primarily with respect to tool for use in removing retaining clips from horseshoes, it is to be understood that the features thereof will find applicability to other areas, such as the removal of other fastening devices where a torquing force is useful for removing the fastener from the surface to which it is secured.

The apparatus and methods of this invention, and their various optional embodiments, are shown in FIGS. 1–5, and will be described with respect thereto.

Figure 5:
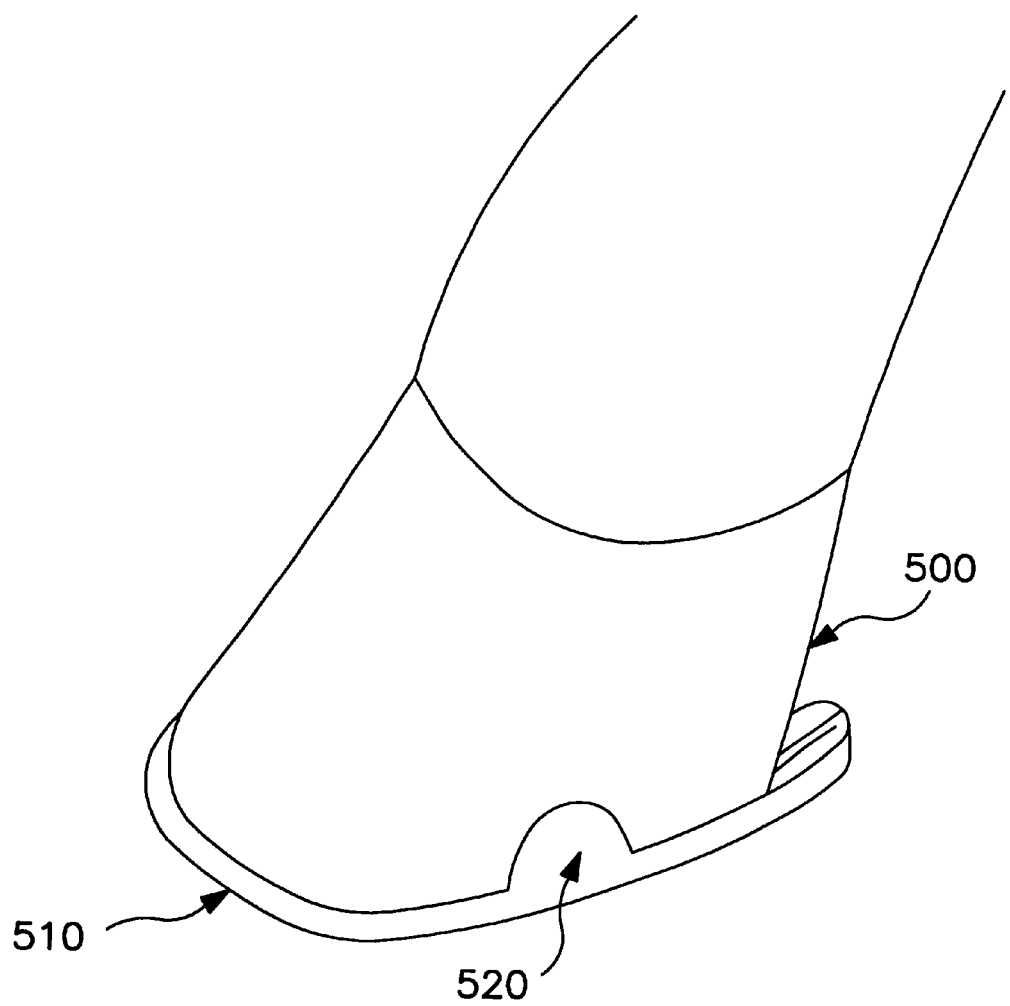
FIG. 5 depicts the lower portion of an animal's leg, showing the hoof with an attached horseshoe having retaining clips.

By way of orientation, FIG. 5 depicts the lower leg of an animal wearing a horseshoe. Although this invention is primarily described with respect to horseshoes applied to the hooves of horses, the invention is envisioned as being equally applicable to any other situation where a protective shoe is attached to the hoof of any hooved animal. To this end, although the term "horseshoe" is used throughout, this term should not be construed as limited to shoes applied to horses, rather, it refers to a protective shoe applied to the hoof of any animal. A horseshoe 510 is attached to the bottom of the animal's hoof 500, and includes at least one clip 520. The apparatus and method of this invention are particularly well-suited for use in removing the clips from the horseshoe, although other beneficial applications of this invention will be described as well.

Figure 1A:
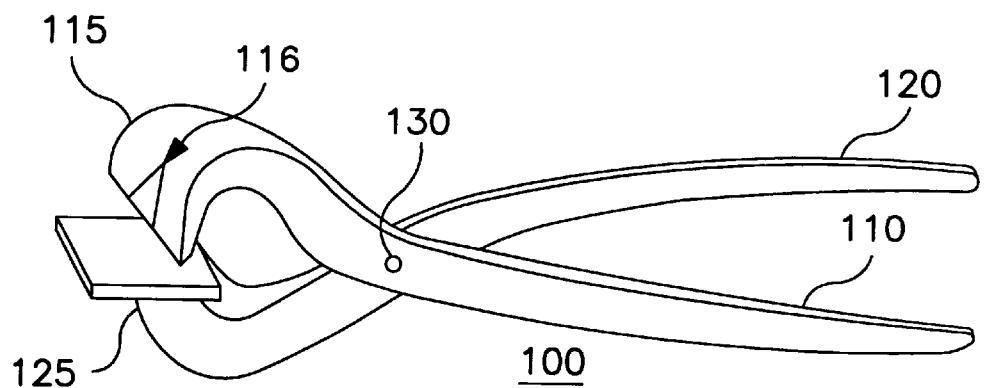
FIGS. 1A and 1B depict perspective and plan views, respectively, of a first embodiment of a tool for removing retaining clips.
Figure 1B:
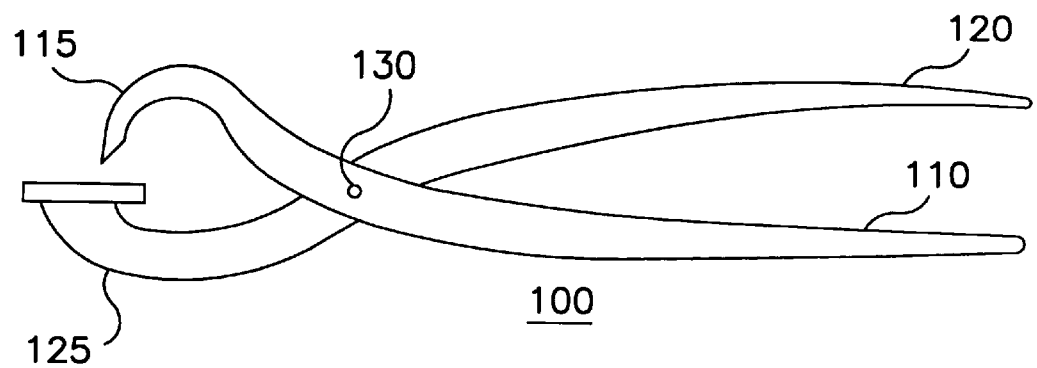

As illustrated in FIG. 1, the tool 100 according to this invention generally resembles a pair of pliers. Specifically, a first plier lever 110 and a second plier lever 120 are provided. The plier levers are attached at pivot point 130 using any standard fastening device, such as a screw, nut, pin, or other similar means, such that the plier levers are able to pivot with respect to each other about axis of the pivot point. First plier lever 110 includes a wedge-shaped upper-jaw 115, which may optionally include an upper jaw notch 116 for facilitating wedging the upper jaw between a fastening device and a surface, such as between a horseshoe fastening clip and an animal's hoof. Second plier lever 120 includes a surface-supporting lower jaw 125. The lower jaw 125 preferably includes a surface that is perpendicular, or approximately perpendicular, to the upper jaw when the first and second plier levers 110 and 120 are oriented such that the jaws are closed. However, any angle or shape of support surface may be used so long as the design allows the support surface of the lower jaw to be in contact with the bottom of the hoof while the upper wedge jaw is in contact with the side or wall of the hoof.

The tool of this invention may be formed of any durable material that is preferably resistant to corrosion. Preferred materials are metals, and a particularly preferred metal is stainless steel. However, any suitable material may be used. Further, the tool of this invention is preferably comfortable for the user to grip, and may therefore include a non-slip handle portion for the plier levers, such as a rubberized or texturized handle.

Figure 2A:
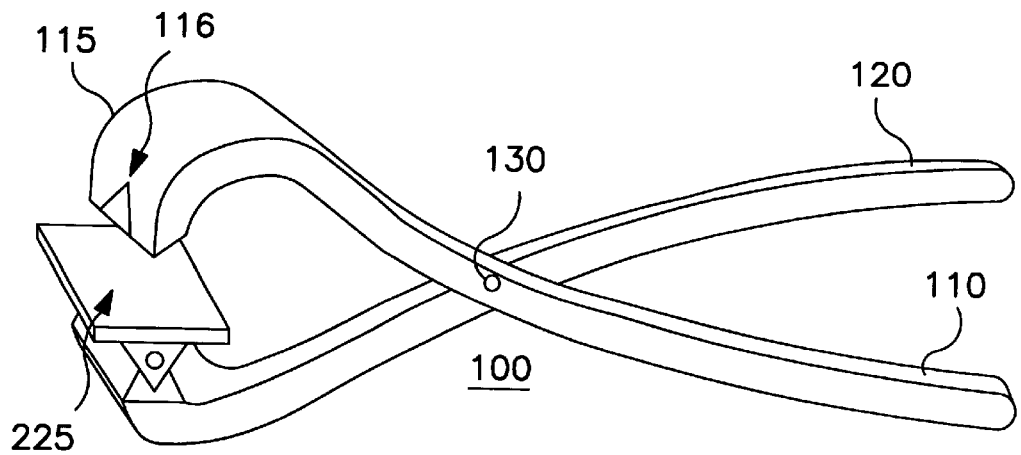
FIGS. 2A and 2B depict perspective and plan views, respectively, of a second embodiment of a tool for removing retaining clips.
Figure 2B:
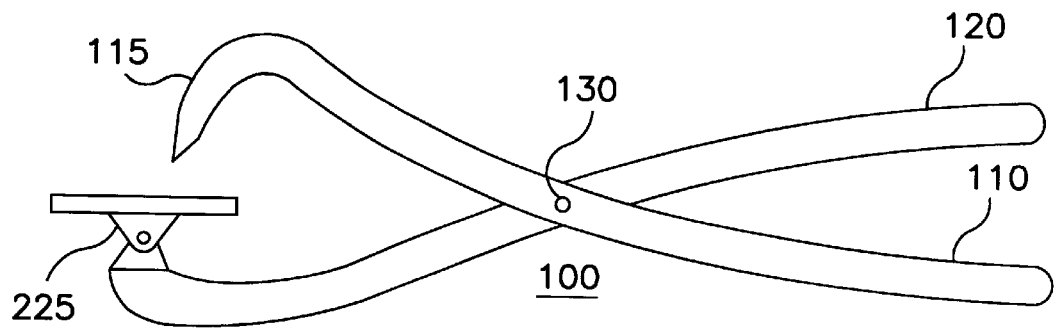
Figure 3A:
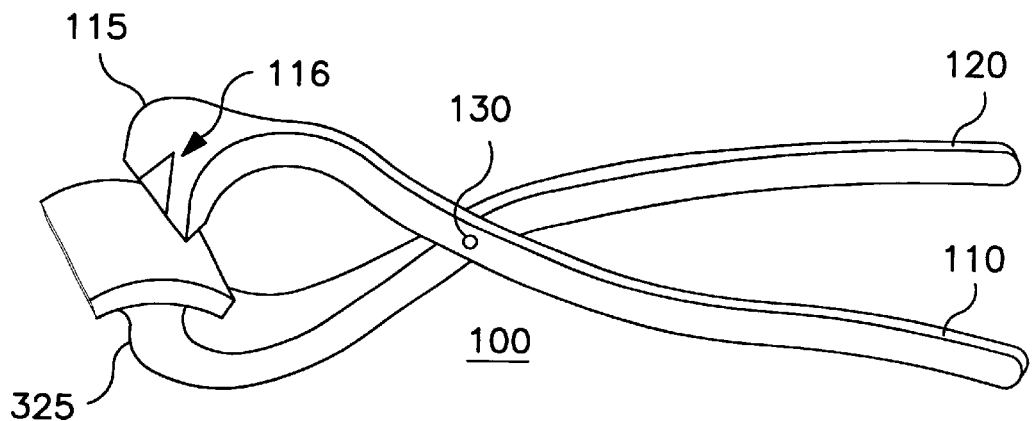
FIGS. 3A and 3B depict perspective and plan views, respectively, of a third embodiment of a tool for removing retaining clips.
Figure 3B:
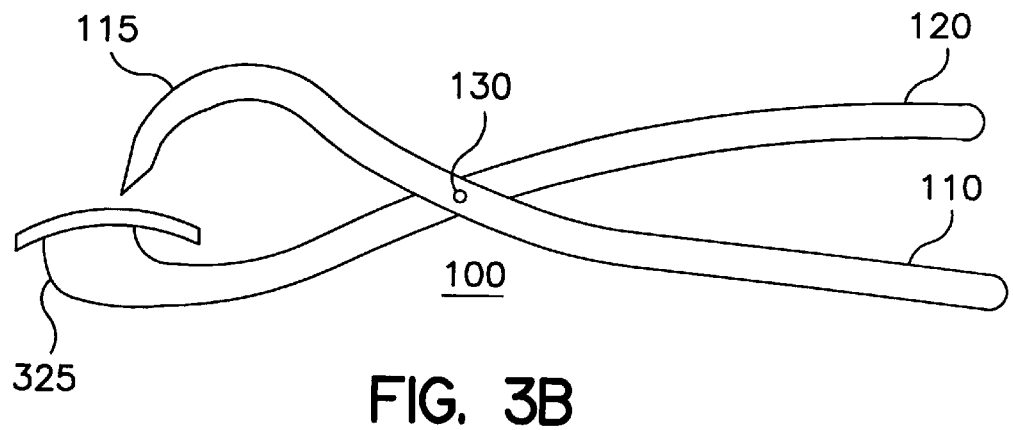

FIG. 2 depicts another embodiment of the tool 100, wherein the surface-supporting lower jaw 225 includes a pivoting mechanism that allows the surface to swivel about an axis parallel to the edge of the upper wedge-sectioned jaw 115. This optional arrangement beneficially allows the surface-supporting jaw 225 to always be aligned against the bottom of the shod hoof while the upper wedge 115 is aligned with the hoof wall 500. This allows proper positioning for forcing the tool between the outer wall of the hoof 500 and the inner face of the shoe clip 520, and the shoe clip 520 is then easily opened by squeezing the plier levers 110 and 120 closed. In FIG. 3, the surface-supporting lower jaw 325 is provided with a curved surface. The curved surface of this optional embodiment for the lower jaw 325 provides similar benefits to the swivel arrangement provided in FIG. 2, and allows the surface-supporting lower jaw 325 to be aligned against the bottom of the hoof when the upper wedge 115 is aligned with the wall of the hoof 500.

Figure 4:
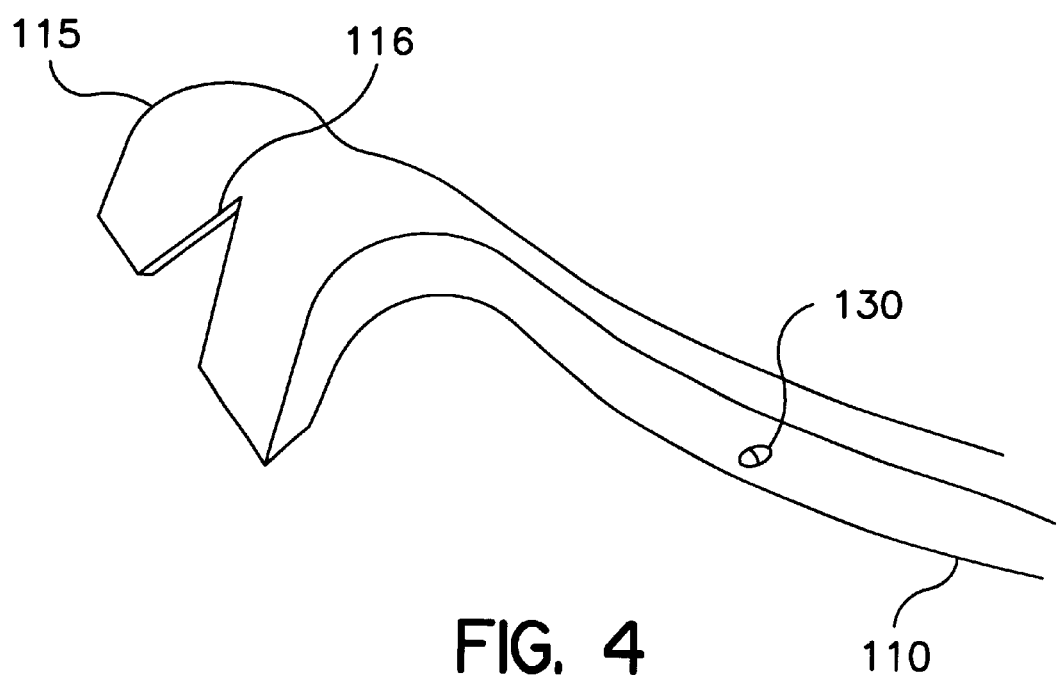
FIG. 4 depicts a perspective view of an optional embodiment of a tool for removing retaining clips.

FIG. 4 provides additional detail for the first plier lever 110, with its wedge-sectioned upper jaw 115, where in the upper jaw 115 includes the optional notch 116. Inclusion of such a notch in the wedge-shaped upper jaw 115 facilitates wedging the upper jaw 115 between the hoof wall 500 and the inner face of the clip 520.

As discussed above, the tool of this invention is generally similar in design to a pliers having specially-adapted jaws. The tool is preferably designed so that it can be manipulated by the user with only one hand, thereby allowing the other hand to be free to hold the lower leg and/or hoof of the animal from which the shoe is being removed. Obviously, such an arrangement is beneficial because it allows the user to retain greater control over the animal. In order to facilitate single-handed operation, the primary consideration is the size of the tool. The tool is preferably sized so that the user is able to grasp the ends of the plier levers 110 and 120 together in one hand and squeeze them open and closed, while still being large enough to provide adequate torque to allow the tool to wedge open the fastening clips. It is considered to be within the level of skill of one ordinarily skilled in the art to determine the proper range of sizes for the tool of this invention using these criteria.

According to the methods of this invention, the tool is preferably placed against the side of a surface, such as an animal's hoof, to allow the wedge-sectioned jaw 115, optionally including a notch 116, to be positioned so as to pry between the fastener, which may be a retaining clip or tab 520 on a horseshoe 510, and the surface to which the fastener is attached, such as the wall of the hoof 500. The surface-supporting lower jaw (any of 125, 225, or 325) is placed for example, under the hoof 500, and positioned so that it presses against the bottom of the surface or hoof (not shown). By squeezing the plier levers 110 and 120 shut, the upper jaw 115 is forced between the surface, or wall of the hoof 500, and the inner surface of the clip, or tab 520, thereby allowing the tool to obtain leverage, and forcing the clip to plastically deform away from the surface or hoof wall 500. This squeezing is continued until adequate clearance exists between the surface and the fastener so that the attached item, in this case, the shoe 510, can be easily removed.

As described above, the apparatus of this invention may be used in applications other than removal of retaining clips from horseshoes. The tool may be used in any situation where it is necessary to remove clips or tabs used to secure various items to surfaces, and is particularly useful in wedging such fastening devices away from surfaces without causing damage to those surfaces.

Thus, what has been described is a tool for efficiently removing retaining clips from a surface, a method of removing retaining clips from a surface, and a tool and method for removing retaining clips used to secure horseshoes to animal hooves. Where the tool and method are used to remove horseshoes, they preferably minimize discomfort caused to the animal wearing the horseshoes being removed. While this invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. Therefore, the scope of the following claims is to be accorded the broadest interpretation so as to encompass all such modifications and equivalents.

What is claimed is:

1. An apparatus for use in loosening a horseshoe fastener clip comprising:
   (a) a first plier lever;
   (b) a second plier lever;
   (c) a pivot point at which said first and second plier levers are rotatably fastened;
   (d) an upper jaw portion provided on said first plier lever, wherein said upper jaw portion comprises a wedge configured to be wedged between the horseshoe fastener clip and a horse hoof; and
   (e) a lower jaw portion provided on said second plier lever, wherein said lower jaw portion has a face that contacts said wedge when said first and second plier levers are pivoted closed, said lower jaw portion face being configured to support a bottom surface of the horseshoe.

2. The apparatus of claim 1, wherein the wedge is provided with a notch.

3. The apparatus of claim 1, wherein the face of said lower jaw portion is substantially perpendicular to said wedge portion when the first and second plier levers are pivoted closed.

4. The apparatus of claim 1, wherein the face of said lower jaw portion is provided with a pivoting joint, and said pivoting joint rotates about an axis parallel to said wedge portion.

5. The apparatus of claim 1, wherein the face of said lower jaw portion is provided with a curved surface.

6. The apparatus of claim 1, wherein the first and second plier levers are capable of being manipulated with a single hand.

7. A method for removing a horseshoe clip fastener, comprising the steps of:
   (a) providing a first plier lever;
   (b) providing a second plier lever;
   (c) providing a pivot point at which said first and second plier levers are rotatably fastened;
   (d) providing an upper jaw wedge portion on said first plier lever, said wedge being configured to be wedged between the horseshoe fastener clip and a horse hoof;
   (e) inserting said wedge portion between the fastener and the horse hoof;
   (f) providing a lower jaw portion on said second plier lever;
   (g) placing said lower jaw portion against a bottom of the horseshoe; and
   (h) pivoting the first and second plier levers such that the wedge portion is pivoted toward said lower jaw portion, thereby wedging the horseshoe fastener clip from the horse hoof.

8. The method of claim 7, wherein said wedge portion is further provided with a notch.

9. The method of claim 7, wherein the lower jaw portion is substantially perpendicular to said wedge portion when the first and second plier levers are pivoted closed.

10. The method of claim 7, wherein the lower jaw portion is provided with a pivoting joint, and said pivoting joint rotates about an axis parallel to said wedge portion.

11. The method of claim 7, wherein the lower jaw portion is provided with a curved surface.

12. The method of claim 7, wherein the first and second plier levers are capable of being manipulated with a single hand.

13. A farrier tool for removing retaining clips from a horseshoe fastened to an animal hoof, comprising:
   (a) a first plier lever;
   (b) a second plier lever;
   (c) a pivot point at which said first and second plier levers are rotatably fastened;
   (d) an upper jaw portion provided on said first plier lever, wherein said upper jaw portion comprises a wedge configured to be wedged between the horseshoe retaining clip and the horse hoof; and
   (e) a lower jaw portion provided on said second plier lever, wherein said lower jaw portion has a face that contacts said wedge when said first and second plier levers are pivoted closed, said lower jaw portion face being configured to support the bottom of the horseshoe.

14. The tool of claim 13, wherein the wedge is provided with a notch.

15. The apparatus of claim 13, wherein the face of said lower jaw portion is substantially perpendicular to said wedge portion when the first and second plier levers are pivoted closed.

16. The tool of claim 13, wherein the face of said lower jaw portion is provided with a pivoting joint, and said pivoting joint rotates about an axis parallel to said wedge portion.

17. The tool of claim 13, wherein the face of said lower jaw portion is provided with a curved surface.

18. The tool of claim 13, wherein the first and second plier levers are capable of being manipulated with a single hand.

19. A method for removing retaining clips from a horseshoe fastened to an animal hoof, comprising the steps of:
   (a) providing a first plier lever;
   (b) providing a second plier lever;
   (c) providing a pivot point at which said first and second plier levers are rotatably fastened;
   (d) providing an upper jaw wedge portion on said first pliher lever, said upper jaw wedge being configured to be wedged between the horseshoe retaining clip and the animal hoof;
   (e) inserting said wedge portion between the retaining clip and the animal hoof;
   (f) providing a lower jaw portion support surface on said second plier lever;
   (g) placing raid lower jaw portion support surface against the bottom of said horseshoe; and
   (h) pivoting the first and second plier levers such that the wedge portion is pivoted toward said lower jaw portion, thereby wedging the retaining clip away from said animal hoof.

20. The method of claim 19, wherein said wedge portion is further provided with a notch.

21. The method of claim 19, wherein the lower jaw portion support surface is substantially perpendicular to said wedge portion when the first and second plier levers are pivoted closed.

22. The method of claim 19, wherein the lower jaw portion support surface is provided with a pivoting joint, and said pivoting joint rotates about an axis parallel to said wedge portion.

23. The method of claim 19, wherein lower jaw portion support surface is provided with a curved surface.

24. The method of claim 19, wherein the first and second plier levers are capable of being manipulated with a single hand.

* * * * *